United States Patent
Matsui et al.

(10) Patent No.: US 9,731,396 B2
(45) Date of Patent: Aug. 15, 2017

(54) METHOD OF PREPARING SYNTHETIC QUARTZ GLASS SUBSTRATE

(71) Applicant: SHIN-ETSU CHEMICAL CO., LTD., Tokyo (JP)

(72) Inventors: Harunobu Matsui, Joetsu (JP); Daijitsu Harada, Joetsu (JP); Masaki Takeuchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/597,714

(22) Filed: Jan. 15, 2015

(65) Prior Publication Data
US 2015/0202731 A1    Jul. 23, 2015

(30) Foreign Application Priority Data

Jan. 20, 2014  (JP) ................. 2014-007673

(51) Int. Cl.
   *C09G 1/02* (2006.01)
   *B24B 7/24* (2006.01)
   *C03C 3/06* (2006.01)

(52) U.S. Cl.
   CPC ............ *B24B 7/241* (2013.01); *C03C 3/06* (2013.01); *C03C 2204/08* (2013.01)

(58) Field of Classification Search
   CPC ......................................... C09G 1/02
   See application file for complete search history.

(56) References Cited

U.S. PATENT DOCUMENTS

| | | | |
|---|---|---|---|
| 2003/0010252 A1* | 1/2003 | Arita | C09D 11/32 106/31.27 |
| 2007/0281486 A1* | 12/2007 | Han | C09G 1/02 438/692 |
| 2009/0158775 A1 | 6/2009 | Takizawa et al. | |
| 2010/0120250 A1* | 5/2010 | Amanokura | C09G 1/02 438/693 |
| 2011/0151752 A1 | 6/2011 | Ono et al. | |
| 2012/0251711 A1 | 10/2012 | Sakai et al. | |
| 2013/0029099 A1* | 1/2013 | Nakae | C03C 3/095 428/141 |
| 2013/0327977 A1* | 12/2013 | Singh | H01L 21/30625 252/79.1 |

FOREIGN PATENT DOCUMENTS

JP   2009-87441 A   4/2009

OTHER PUBLICATIONS

Extended European Search Report dated Mar. 3, 2016, issued in counterpart European Patent Application No. 15150963.5 (6 pages).

* cited by examiner

*Primary Examiner* — Pegah Parvini
(74) *Attorney, Agent, or Firm* — Westerman, Hattori, Daniels & Adrian, LLP

(57) ABSTRACT

A synthetic quartz glass substrate is prepared by immersing a starting substrate in an aqueous solution of a nonionic surfactant and precision polishing the substrate with a colloidal silica water dispersion. A synthetic quartz glass substrate having a few defects and low surface roughness is obtained while the polishing rate is improved and the polishing time is reduced.

5 Claims, No Drawings

METHOD OF PREPARING SYNTHETIC QUARTZ GLASS SUBSTRATE

CROSS-REFERENCE TO RELATED APPLICATION

This non-provisional application claims priority under 35 U.S.C. §119(a) on Patent Application No. 2014-007673 filed in Japan on Jan. 20, 2014, the entire contents of which are hereby incorporated by reference.

TECHNICAL FIELD

This invention relates to a method of preparing synthetic quartz glass substrates by polishing with a colloidal silica water dispersion, the substrates being suited for use in the advanced technology as photomasks, nanoimprint molds and liquid crystal color filters.

BACKGROUND ART

As the technology of implementing lithography with shorter wavelength light is established, the pattern can be processed to a ultrafine feature size. Since the depth of focus becomes shallower as the wavelength becomes shorter, synthetic quartz glass substrates for use in masks need completeness. Specifically, substrates for micropatterning reflective masks are desired to have a high flatness, low roughness, and mitigated defects on their surface.

It is also contemplated to use synthetic quartz glass substrates meeting the requirements of defect control and low roughness as the substrate for use in the micropatterning technology using the currently available ArF excimer laser (wavelength 193 nm), double-patterning or other shrinking mode, or EUV lithography.

Synthetic quartz glass substrates for use as photomasks, nanoimprint molds and liquid crystal filters must comply with the required specifications including high flatness, high smoothness, and defect control. To this end, they are subjected to several resurfacing steps including lapping and polishing steps before they are ready for use in the subsequent process. The lapping step is to remove work strains introduced by slicing from an ingot. The polishing step is to mirror finish the substrate for modifying the flatness and shape of its surface. The final polishing step is to polish the substrate with a polishing slurry of colloidal silica abrasive, obtaining a substrate with a flat and smooth surface and devoid of microscopic defects.

As the technique of finishing surfaces of synthetic quartz glass substrates to low defect density and low roughness, it is currently a common practice to carry out the final precision polishing step using a soft suede-type polishing pad along with a polishing slurry of colloidal silica abrasive.

Under the trend of EUV lithography toward the miniaturization of the design rule, active efforts are made to increase the polishing accuracy of the precision polishing step using colloidal silica slurry.

For example, Patent Document 1 discloses a method of polishing a glass substrate with a polishing slurry of silica grains under such conditions that the potential difference between the workpiece or glass substrate and agglomerates of silica grains may be up to 20 mV, for thereby preventing the silica agglomerates from depositing on the glass substrate. It is described that unlike the zeta potential of individual silica grains, the zeta potential of silica agglomerates has changed toward zero potential.

Although polishing with colloidal silica abrasive grains is effective for producing a substrate surface having a low roughness and low defectiveness, the polishing rate is outstandingly slow as compared with cerium oxide and zirconium oxide abrasive grains. While controlling the zeta potential so as to inhibit deposition of silica agglomerates onto the glass substrate surface is effective for surface modification, as described in Patent Document 1, there is a possibility that the polishing rate is further retarded from the polishing step using customary colloidal silica abrasive grains. From the industrial aspect, the process is not regarded as having satisfactory throughputs.

CITATION LIST

Patent Document 1: JP-A 2009-087441

DISCLOSURE OF INVENTION

An object of the invention is to provide a method of polishing a synthetic quartz glass substrate with a colloidal silica water dispersion at a satisfactory polishing rate into a synthetic quartz glass substrate capable of meeting the requirements of defect control and low roughness for the surface of photomask and other substrates.

The inventors made research on the step of polishing a synthetic quartz glass substrate using a polishing slurry of colloidal silica abrasive grains, with a focus on the surface state of the substrate. It has been found that if the substrate is immersed in an aqueous solution containing a nonionic surfactant immediately before polishing, then the polishing rate is improved while maintaining the surface quality unchanged from the polishing step with a polishing slurry of customary colloidal silica abrasive grains.

Accordingly, the invention provides a method of preparing a synthetic quartz glass substrate comprising the steps of immersing a synthetic quartz glass substrate in an aqueous solution containing a surfactant, and then precision polishing the substrate with a colloidal silica water dispersion.

Preferably, the surfactant is a nonionic surfactant, more preferably a linear alkyl ether surfactant. The nonionic surfactant typically has an HLB value of 8 to 15. Preferably, the surfactant is added to the aqueous solution in a concentration of 0.01 to 0.5% by weight.

Preferably, the colloidal silica water dispersion contains colloidal silica abrasive grains having a primary grain size of 20 to 200 nm.

Preferably, the polishing step uses a suede-type polishing pad having a nap layer which is expanded using a surfactant.

Advantageous Effects of Invention

The invention is successful in preparing a synthetic quartz glass substrate having mitigated defects and low roughness at its surface while improving the polishing rate over the polishing step with a polishing slurry of customary colloidal silica abrasive grains. The time taken for the preparation of such a substrate is reduced, leading to a slimming of the process and a reduction of preparation cost.

DESCRIPTION OF PREFERRED EMBODIMENTS

According to the invention, a synthetic quartz glass substrate is immersed in an aqueous solution having added thereto a surfactant, especially alkyl ether type nonionic surfactant immediately before the substrate is polished with a polishing slurry of colloidal silica abrasive grains. The immersion establishes, at the start of polishing, an environment around the substrate surface that facilitates colloidal silica abrasive grains to gather at the substrate surface. Specifically, more colloidal silica abrasive grains are electrostatically attracted to the substrate surface at the earliest point of precision polishing step. That is, more colloidal silica abrasive grains are distributed on the substrate surface. Then an electrostatic attractive force or van der Waals force develops between colloidal silica abrasive grains to increase the chance of following colloidal silica abrasive grains impinging the substrate surface, which is effective for improving the polishing rate and accomplishing the substrate surface having mitigated defects and low roughness at the same time.

The method of the invention is also effective for improving the polishing rate for any size of synthetic quartz glass substrates and efficient in preparing substrates meeting the requirements of defect control and low roughness.

In general, synthetic quartz glass substrates are polished using a polishing pad and a polishing slurry of colloidal silica abrasive grains. As the polishing pad, a suede-type polishing pad is selected which is advantageous for finishing the synthetic quartz glass substrate surface to low defectiveness and high smoothness. This is because the step using a polishing slurry of colloidal silica abrasive grains is typically the semi-final or final polishing step that governs the surface quality.

While the suede-type polishing pad includes a base layer and a nap layer which will come in contact with the substrate upon polishing, a nonionic or anionic surfactant is used to form an expanded or porous structure for the nap layer. After the nap layer is formed, the polishing pad is cleaned and becomes ready for use. At this point, there is a possibility that the surfactant remains in the expanded structure of the nap layer. In fact, a phenomenon that bubbles presumably originating from the residual surfactant generate in the polishing slurry is often observed in the course of polishing.

It is believed from this phenomenon that because of the impact of electrical attraction of the residual surfactant in the polishing pad and the spatial obstruction by generated bubbles, colloidal silica abrasive grains participating in polishing continuously come in contact with portions of the synthetic quartz glass substrate (i.e., workpiece) surface rather than the entire surface. Eventually, polishing prevails over the entire surface.

However, when the surface of the substrate is treated with a surfactant immediately before the polishing step using a suede-type polishing pad and a polishing slurry of colloidal silica abrasive grains, more colloidal silica abrasive grains are electrically attracted toward the substrate surface to increase the probability of abrasive grains impinging the substrate or workpiece and to improve the polishing rate. Specifically, interaction occurs between the nonionic surfactant on the substrate surface and colloidal silica grains in the polishing slurry before the residual surfactant in the nap layer of the suede-type polishing pad is leached out with water in the polishing slurry. Then, the probability of colloidal silica grains available on the substrate surface at the earliest point of the polishing step is increased so that polishing may be started from the increased grinding force state.

When a synthetic quartz glass substrate is mounted on a polishing machine, generally the potential at the substrate surface is not zero, i.e., the substrate surface is often charged negative. When colloidal silica grains as the abrasive approach such a substrate surface, they carry out polishing action while undergoing electric repulsion. By contrast, now that the potential of the substrate surface is made approximately zero by the surfactant pretreatment according to the invention, colloidal silica grains easily approach the substrate surface. A nonionic surfactant is preferred in that the nonionic surfactant promotes progress of polishing without inducing the above-mentioned side reaction because it is free of electric charge.

Some suede-type polishing pads have a nap layer which is formed using an electrically charged surfactant, typically anionic surfactant. In the polishing step using such a polishing pad, if a surfactant other than the nonionic one is used in the pretreatment, interaction can occur between different surfactants, that is, the residual surfactant in the polishing pad and the surfactant on the synthetic quartz glass substrate surface, giving rise to the problem of the polishing slurry becoming unstable, for example.

The nonionic surfactant used herein is preferably a linear alkyl ether surfactant for the following reason. In general, when colloidal silica abrasive grains are used as a polishing slurry, the slurry is often alkaline or weakly acidic. An ether bond has the nature that it undergoes cleavage only under strong acidic conditions. With these factors taken into account, the nonionic surfactant of alkyl ether form has a least possibility that its structure is chemically broken during polishing. Further, since the alkyl chain of linear structure minimizes the chance of the surfactant molecule taking a bulky steric structure, the surfactant is unlikely to become a barrier against collision between colloidal silica abrasive grains and the substrate surface.

Also preferably the nonionic surfactant has an HLB value in the range of 8 to 15. It is noted that the HLB value is a hydrophile-lipophile balance value given by Griffin's equation:

$$HLB=(Mh/M)\times(100/5)$$

wherein Mh is the molecular weight of polyoxyethylene chain and M is the molecular weight of nonionic surfactant. If the HLB is less than 8, the nonionic surfactant on the synthetic quartz glass substrate surface tends to exert the function of defoamer and incur interaction with the residual surfactant in the polishing pad. As a result, the electric balance of the polishing slurry is upset, giving rise to the problem that colloidal silica grains agglomerate together or dissolve away. If the HLB exceeds 15, the nonionic surfactant on the substrate surface may gather around colloidal silica abrasive grains to form a micelle structure to detract from the grinding force of colloidal silica abrasive grains.

As the aqueous solution of nonionic surfactant in which a synthetic quartz glass substrate is immersed, any of solutions obtained by dissolving commercially available nonionic surfactants in deionized water may be used. Suitable nonionic surfactants include Newcol series by Nippon Nyukazai Co., Ltd., Sunmorl series by Nicca Chemical Co., Ltd., and Emulgen series by Kao Corp.

The aqueous solution of surfactant in which a synthetic quartz glass substrate is immersed preferably has a concentration of 0.01 to 0.5% by weight, more preferably 0.01 to 0.1% by weight. An aqueous solution with a concentration of less than 0.01 wt % may sometimes fail to provide the synthetic quartz glass substrate surface with a change of potential necessary to attract colloidal silica abrasive grains to the substrate surface. An aqueous solution with a concentration of more than 0.5 wt % may allow the surfactant to interact with the residual surfactant in the polishing pad, giving rise to the problem of the polishing slurry becoming unstable, for example. When a synthetic quartz glass substrate is immersed in the aqueous solution of surfactant, the immersion treatment temperature may be room temperature or elevated temperature and the immersion time may be preferably 1 to 180 seconds, more preferably 10 to 150 seconds, most preferably 10 to 100 seconds.

The slurry which is concomitantly fed during the polishing step is based on colloidal silica abrasive grains. The abrasive grains preferably have a primary grain size of 20 to 200 nm, more preferably 20 to 150 nm, and even more preferably 20 to 100 nm. Outside the range, abrasive grains of smaller size are advantageous for rendering the synthetic quartz glass substrate surface highly flat, but remain as residues or protruding defects after polishing because such smaller grains are likely to agglomerate together and adhere to the substrate surface. Inversely, abrasive grains of larger size are effective for increasing the polishing rate and thus reducing the polishing time, from which an improvement in productivity is expectable, but worsen the surface roughness of polished substrates and are thus often inadequate for use in the final polishing step.

As the colloidal silica abrasive, commercially available products may be used as well as slurries of solid abrasive grains in deionized water. Examples of colloidal silica slurry include COMPOL®-50, COMPOL-80, COMPOL-120, and COMPOL-EXIII from Fujimi Inc., ST-XL, ST-YL, and ST-ZL from Nissan Chemical Industries Co., Ltd., Syton® from Dupont, and GP series from Fuso Chemical Co., Ltd. As the polishing pad, a suede-type polishing pad having a nap layer which is expanded (or made porous) using a nonionic or anionic surfactant, especially nonionic surfactant is preferably used.

The process of polishing synthetic quartz glass substrates, after the pretreatment, using the above polishing pad along with the above polishing slurry is advantageous in that the life of the polishing pad is extended, the number of defects of a size detectable by a high-sensitivity defect detector is reduced, and the surface flatness or smoothness of polished substrates is improved.

The synthetic quartz glass substrate prepared by the inventive method may be used in the semiconductor-related electronic materials, especially as photomasks, nanoimprint molds, LC color filters, and magnetic devices. Although the size of substrates is not particularly limited, suitable substrates to be polished include substrates of square shape, such as substrates of 5 inches squares and 6 inches squares, and substrates of round shape such as wafers with a diameter of 6 inches and 8 inches.

The synthetic quartz glass substrate may be suitably processed before it is subjected to the inventive method. For example, a synthetic quartz glass ingot is shaped, annealed, sliced, chamfered, lapped, and polished to a mirror finish before the substrate is subjected to the inventive method. In this sense, the inventive method is applied to the thus processed substrate as the semi-final or final polishing step.

The polishing method of the invention is generally performed by a batchwise double-side polishing machine, although a single-side polishing machine may be used. The polishing method may be performed in combination with another polishing technique such as single wafer polishing. Preferably the polishing pressure is in a range of about 50 to 150 gf/cm$^2$, but not limited thereto.

EXAMPLE

Examples are given below by way of illustration and not by way of limitation.

Example 1

A synthetic quartz glass substrate stock as sliced (6 inch squares and 6.35 mm thick) was lapped on a double-side lapping machine of planetary motion, and roughly polished on a double-side polishing machine of planetary motion, obtaining a starting substrate.

The substrate as roughly polished was immersed in a 0.05 wt % aqueous solution of a nonionic surfactant, Newcol 2310 (polyoxyethylene alkyl ether, HLB 14.0, Nippon Nyukazai Co., Ltd.) for 45 seconds. Thereafter, the substrate was polished using a polishing pad and slurry. The polishing pad had a nap layer expanded using a nonionic surfactant. The polishing slurry was a water dispersion of colloidal silica having a SiO$_2$ concentration of 40 wt % and a grain size of 76.8 nm (Fujimi Inc.). Polishing was performed under a pressure of 100 gf/cm$^2$, with an allowance of 5 µm being set. Polishing was completed in 20 minutes.

Polishing was followed by cleaning and drying. The substrate was inspected for defects using a laser confocal optics high-sensitivity defect inspection system (Lasertec Corp.), finding an average of 1.8 defects with a major diameter of the order of 40 nm or greater. The substrate had a surface roughness (Rms) of 0.15 nm.

Example 2

The substrate roughly polished as in Example 1 was immersed in a 0.01 wt % aqueous solution of a nonionic surfactant, Newcol 2303 (polyoxyethylene alkyl ether, HLB 8.3, Nippon Nyukazai Co., Ltd.) for 10 seconds. Thereafter, the substrate was polished using a polishing pad and slurry. The polishing pad had a nap layer expanded using a nonionic surfactant. The polishing slurry was a water dispersion of colloidal silica having a SiO$_2$ concentration of 40 wt % and a grain size of 54.8 nm (Fujimi Inc.). Polishing was performed under a pressure of 100 gf/cm$^2$, with an allowance of 5 µm being set. Polishing was completed in 24 minutes.

Polishing was followed by cleaning and drying. The substrate was inspected for defects using the defect inspection system (Lasertec Corp.), finding an average of 1.6 defects with a major diameter of the order of 40 nm or greater. The substrate had a surface roughness (Rms) of 0.15 nm.

Example 3

The substrate roughly polished as in Example 1 was immersed in a 0.05 wt % aqueous solution of a nonionic surfactant, Emulgen 709 (polyoxyethylene alkyl ether, HLB 13.3, Kao Corp.) for 100 seconds. Thereafter, the substrate was polished using a polishing pad and slurry. The polishing pad had a nap layer expanded using a nonionic surfactant. The polishing slurry was a water dispersion of colloidal silica having a SiO$_2$ concentration of 40 wt % and a grain size of 100.2 nm (Nissan Chemical Industries, Ltd.). Polishing was performed under a pressure of 90 gf/cm$^2$, with an allowance of 5 µm being set. Polishing was completed in 22 minutes.

Polishing was followed by cleaning and drying. The substrate was inspected for defects using the defect inspection system (Lasertec Corp.), finding an average of 1.6 defects with a major diameter of the order of 40 nm or greater. The substrate had a surface roughness (Rms) of 0.17 nm.

Example 4

A wafer as sliced (diameter 8 inches, 0.725 mm thick) was lapped on a double-side lapping machine of planetary motion, and roughly polished on a double-side polishing machine of planetary motion, obtaining a starting substrate. The substrate was immersed in a 0.05 wt % aqueous solution of a polyoxyethylene alkyl ether with HLB of 13.2 for 30 seconds. Thereafter, the substrate was polished under a pressure of 50 gf/cm$^2$, using a polishing pad and slurry. The polishing pad was the same as in Example 1. The polishing slurry was a water dispersion of colloidal silica having a $SiO_2$ concentration of 20 wt % and a grain size of 82.2 nm (Fuso Chemical Industry Co., Ltd.).

Polishing was followed by cleaning and drying. The substrate had a surface roughness (Rms) of 0.15 nm. Polishing-affected flaws in the form of scratches or pits were not detected.

Comparative Example 1

The substrate roughly polished as in Example 1 was polished using a polishing pad and slurry, without pretreatment with nonionic surfactant. The polishing pad had a nap layer expanded using a nonionic surfactant. The polishing slurry was a water dispersion of colloidal silica having a $SiO_2$ concentration of 40 wt % and a grain size of 54.8 nm (Fujimi Inc.). Polishing was performed under a pressure of 100 gf/cm$^2$, with an allowance of 5 μm being set. Polishing was completed in 42 minutes.

Polishing was followed by cleaning and drying. The substrate was inspected for defects using the defect inspection system (Lasertec Corp.), finding an average of 1.6 defects with a major diameter of the order of 40 nm or greater. The substrate had a surface roughness (Rms) of 0.15 nm.

Japanese Patent Application No. 2014-007673 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of preparing a synthetic quartz glass substrate comprising the steps of:
    immersing a synthetic quartz glass substrate in an aqueous solution containing a linear alkyl ether nonionic surfactant having an HLB value of 8 to 15, and then
    precision polishing the substrate with a colloidal silica water dispersion.

2. The method of claim 1 wherein the surfactant is added to the aqueous solution in a concentration of 0.01 to 0.5% by weight.

3. The method of claim 1 wherein the colloidal silica water dispersion contains colloidal silica abrasive grains having a primary grain size of 20 to 200 nm.

4. The method of claim 1 wherein the polishing step uses a suede-type polishing pad having a nap layer which is expanded using a surfactant.

5. The method of claim 1 wherein the synthetic quartz glass substrate is obtained by shaping, annealing and slicing a synthetic quartz glass ingot, and chamfering, lapping and mirror polishing the sliced substrate.

* * * * *